UNITED STATES PATENT OFFICE.

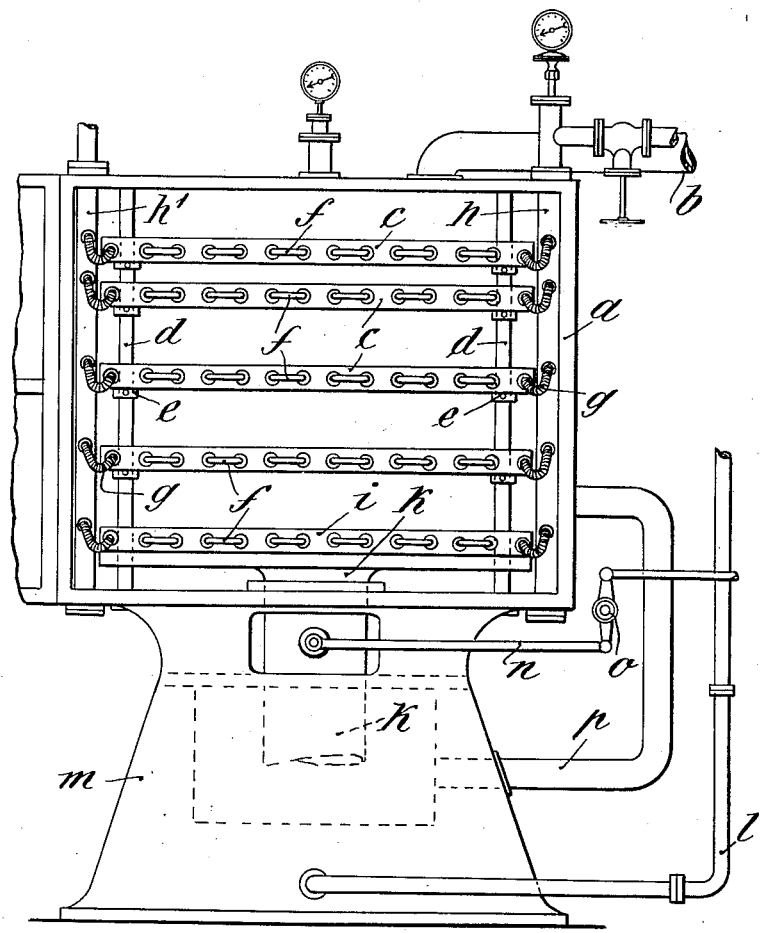

ALFRED SCHLOMANN, OF MUNICH, GERMANY, ASSIGNOR TO VAKUUM-PRESSGUT GESELLSCHAFT M. B. H., OF BERLIN, GERMANY.

METHOD OF MANUFACTURING SUBSTANCES OF HIGH RESISTANCE.

955,360.  Specification of Letters Patent.  Patented Apr. 19, 1910.

Application filed August 4, 1906. Serial No. 329,222.

*To all whom it may concern:*

Be it known that I, ALFRED SCHLOMANN, engineer, citizen of Germany, residing at 5 Renatastrasse, Munich, in the Kingdom of Bavaria and Empire of Germany, have invented a new and useful Method of Manufacturing Substances of High Resistance, of which the following is a specification.

This invention relates to a method of manufacturing substances having a great resistance to physical influences, such as electricity, mechanical actions, humidity, and the like.

The products produced by this method are especially suitable for use as building blocks or tables and as insulators for electricity or other purposes and they may have any desired shape given thereto during the production.

The principal object of the invention is to unite insulating substances so closely and firmly by treating them in a vacuum while under the action of heat and pressure and to make them thereby so non-porous and dry that insulating products of very good physical and mechanical qualities and resistivity are obtained.

By the use of this method, it is possible to preserve permanently the insulating properties of substances which easily attract moisture from the air and thereby lose their insulating properties against electricity. For accomplishing this result, some non-porous substances are applied thereto and they are dried and closely united therewith. In this way, it will be possible to better utilize the insulating properties of hydroscopic silicates, such as asbestos, which heretofore could only be used in very small quantities in the form of powder or fiber as an admixture in the manufacture of artificial insulating materials. Another method of producing insulating masses according to the present invention consists in closely mixing the insulating substances, such as silicates with some waterproof substance such as resin and the like, drying the composition in a vacuum and applying high pressure at the same time. In this way insulating bodies of any desired shape can be obtained which possess very great resistance, very high mechanical strength, and great density against percussion, and which can be easily worked. Metal parts may be pressed into the mass during the formation thereof which after it has cooled adhere as firmly to it as if they were made integral. Further it will be possible to make blocks and the like which consist of alternate layers of different material either both insulating or some of them possessing some other useful properties.

If layers of water-attracting substances with insulating properties are to be inclosed in a waterproof body as for instance in layers of copal, or the like, this may be done by covering the water-attracting substance with the waterproof substance and drying the whole under the exclusion of air by heating it in a vacuum; at the same time pressure is applied to drive out all moisture left therein and to produce a close unity between the inside matter and its covering. Its covering substances solutions of waterproof materials, such as copal, shellac, wax and the like may be used.

If insulating substances are to be made from material having little or no moisture absorbing properties, or if insulating bodies are to be made from mixtures of insulating substances having water-absorbing properties, like asbestos, with waterproof substances like copal, the process will be as follows:—The substance is mixed with an agglutinant such as the mixture of asbestos fiber with copal dissolved in alcohol, and after filling a suitable press-mold therewith it is preliminarily pressed under comparatively high pressure. The substance is then put into a vacuum where it is at the same time heated and pressed by a pressure of an elastic nature; in this way the substance will be perfectly dried, the solvent thoroughly extracted and the mass pressed firmly together. Care should be taken that the vacuum, heat and pressure be brought into action at the same time or at least in quick succession, without taking the material out of the apparatus used in carrying out the process.

The apparatus preferably used for carrying out this process may be constructed as illustrated in the annexed drawing, and consists of a drying oven which can be evacuated and has a press applied. Inside of the casing *a* of the stove are arranged a row of plates *c* made movable on guiding rods *d*. The guiding rods *d* have adjustable set-rings *e* to keep the plates at any convenient fixed distance from each other. Heating pipes *f* are placed through the plates, and the flexible tubes g at each end of the plates, form the connection for the steam conduit pipes h and $h^1$ respectively. A vacuum conduit b is arranged for exhausting the air from the drying oven. The lower end-plate i which is also adjustable is attached to a piston k, which may be introduced into the vacuum box or drying stove by means of a stuffing-box. This piston k is worked by means of the accumulator of a hydraulic press, (not shown in the drawings), a connecting pipe or conduit l being arranged through which the pressing medium passes to the piston k. The piston k is furthermore connected with the valve of the accumulator by means of a lever system n, which passes through the base m, of the drying stove and is pivoted at o. According to the manner of this connection the lifting and lowering of the piston k with the plate i, will therefore effect an increasing or diminishing of the amount of the pressing medium going to the accumulator, so that the pressure in the apparatus will automatically increase or diminish in accordance with the shrinking of the material. If the material while in the drying oven is exposed to a pressure of perhaps 6 atmospheres, exhausting the air at the same time and heating the plates, the substance will be compressed to a certain degree part of the moisture contained in the substance and of the solvent being driven out at the same time. If the heating and pressing continues the last portion of the moisture and solvent will evaporate out of the interior of the mass, which will produce holes in the material and cause it to expand. The pores would naturally diminish the stability and usefulness of the material. To remove same it will of course require a higher pressure than that which was sufficient to first compress the material. This increased pressure will be obtained by the action of the lever system n, effecting the opening or turning of the accumulator-valve. The pores as already stated effect an expanding of the material, on account of which plate i and the piston k are pressed downward to effect a further turning of the accumulator valve through the rod n. The valve being constructed accordingly, this movement will increase the flow of the pressing medium, whereby a greater pressure will be produced. It will be clear that the pressure will regulate itself according to the shrinking in the material, and the degree of pressure will be in accordance with the arrangement of the accumulator valve and the way in which the lever system is connected with it. Through the high pressure under which the material is placed certain portions of moisture vaporized in the interior of the mass are prevented from escaping out of it, for which reason it will be advisable to arrange the pressure as an elastic one. Different methods may be used for this: As an example, a vessel may be connected with the hydraulic press into which the pressing fluid (air or the like) may recede partly when suddenly a pressure of fixed degree is reached in the interior of the drying apparatus; so that the pressure in it will be diminished in the required manner. For the same purpose, a regulator may be provided similar to that effected by means of levers n and o. In this drying apparatus, for carrying out this process, material of different thickness and size can be treated at the same time on account of the arrangement of a plurality of adjustable plates c. Such masses inclosed into pressing molds are placed between the different plates c in such manner that the pressure put on the piston k and plate i will be transmitted by said masses to the plates c. As an additional arrangement a press could be provided which would give the finished article a smooth surface and so prevent the substance from sticking to the molds.

The insulating substance as well as any of the waterproof material or agglutinants may be mixed with coloring matter so that the finished goods are produced in any desirable shading, as marble and the like.

If a water-attracting insulating substance is to be used, as, for instance, silicates, same can also be treated mixed with some other insulating substance as viscose, acetates and the like, no matter whether the insulating substance is only to be covered with a waterproof matter, or whether the insulating substance is to be mixed with same and pressed afterward.

When using copal same can be heated first so as to remove all etheral oils from it, and the residue dissolved in spirit be used for the production of the insulating material; or the copal may be dissolved through heat in its own etheral oils and without using spirit. Copal is given the preference to shellac because the former is lower in price and requires a higher degree of heat for melting.

Having now particularly described and ascertained the nature of my said invention and in what manner the same is to be performed, I declare that what I claim is:

1. A process of manufacturing moisture resisting insulating substances which consists in mixing asbestos fibers with a liquefied resin, and drying the mixture by pressing, heating and evacuating it simultaneously.

2. A process of manufacturing moisture resisting insulating substances which consists in mixing asbestos fibers with liquefied copal, and drying said mixture by pressing, heating and evacuating it simultaneously.

3. A process of manufacturing moisture resisting insulating substances which consists in subjecting moisture absorbing insulating materials and water-proof substances to a high pressure while at the same time heating and evacuating it, and employing an elastic pressure which automatically regulates itself in accordance with the shrinking of the pressed material.

In testimony whereof I have hereunto set my hand in presence of two subscribing witnesses.

ALFRED SCHLOMANN.

Witnesses:
 WM. M. RINHART,
 WILHELM WAGNER.